United States Patent
Cornu et al.

(10) Patent No.: US 9,488,517 B2
(45) Date of Patent: Nov. 8, 2016

(54) PIEZOELECTRIC SENSOR MODULE OF A WIM SYSTEM FOR TWO-TRACK VEHICLES AND MEASUREMENT METHOD

(71) Applicant: KISTLER HOLDING AG, Winterthur (CH)

(72) Inventors: David Cornu, Bellinzona (CH); Adrian Hofmann, Ellikon am Rhein (CH)

(73) Assignee: KISTLER HOLDING AG, Winterthur (CH)

( * ) Notice: Subject to any disclaimer, the term of this patent is extended or adjusted under 35 U.S.C. 154(b) by 149 days.

(21) Appl. No.: 14/400,928

(22) PCT Filed: May 15, 2013

(86) PCT No.: PCT/CH2013/000086
§ 371 (c)(1),
(2) Date: Nov. 13, 2014

(87) PCT Pub. No.: WO2013/170394
PCT Pub. Date: Nov. 21, 2013

(65) Prior Publication Data
US 2016/0187183 A1 Jun. 30, 2016

(30) Foreign Application Priority Data
May 16, 2012 (CH) .......................... 697/12

(51) Int. Cl.
*G01G 19/02* (2006.01)
*G08G 1/02* (2006.01)
*G08G 1/052* (2006.01)
*G01P 3/50* (2006.01)

(52) U.S. Cl.
CPC ............. *G01G 19/024* (2013.01); *G01P 3/50* (2013.01); *G08G 1/02* (2013.01); *G08G 1/052* (2013.01)

(58) Field of Classification Search
CPC .... G01G 19/022; G01G 19/024; G08G 1/02; G08G 1/052; G01P 3/50
See application file for complete search history.

(56) References Cited

U.S. PATENT DOCUMENTS

| 4,049,069 | A | * | 9/1977 | Tamamura | ........... G01G 19/024 177/134 |
| 4,535,858 | A | * | 8/1985 | Provost | ................ G01G 19/027 177/134 |
| 4,712,423 | A | * | 12/1987 | Siffert | ....................... G01L 1/16 177/132 |

(Continued)

FOREIGN PATENT DOCUMENTS

| FR | 2 956 511 | 8/2011 |
| WO | WO 02/23504 | 3/2002 |

OTHER PUBLICATIONS

International Preliminary Report on Patentabiiity for PCT/CH2013/000083, issued Nov. 18, 2014.

*Primary Examiner* — Randy W Gibson
(74) *Attorney, Agent, or Firm* — Dority & Manning, P.A.

(57) ABSTRACT

A sensor module for measuring axle speeds and weights of double-track vehicles which travel in a direction of travel (L) along a carriageway with two lanes includes a plurality of piezoelectric strip sensors (A, B, C, D) that are arranged in a first lane group (I) and a second lane group (II). All the strip sensors (A, B, C, D) are spaced from each other in the direction of travel (L) via a secure longitudinal offset (LAD), which is greater than the maximum wheel contact length, and are offset from one another by between one centimeter and fifteen centimeters in the transversal direction. The sensor module also has a module length (LABCD) of less than 80 centimeters.

19 Claims, 3 Drawing Sheets

(56) References Cited

U.S. PATENT DOCUMENTS

| | | | | |
|---|---|---|---|---|
| 4,793,429 A | * | 12/1988 | Bratton | G01G 19/035 177/1 |
| 5,265,481 A | * | 11/1993 | Sonderegger | G01G 3/13 177/210 C |
| 5,450,077 A | * | 9/1995 | Tyburski | E01F 11/00 200/86 A |
| 5,585,604 A | * | 12/1996 | Holm | G01G 19/035 177/1 |
| 5,710,558 A | * | 1/1998 | Gibson | G08G 1/02 200/85 R |
| 6,137,066 A | * | 10/2000 | Wånelid | G01G 19/035 177/125 |
| 6,853,885 B2 | | 2/2005 | Maeder | |
| 7,136,828 B1 | | 11/2006 | Allen et al. | |

\* cited by examiner

PIEZOELECTRIC SENSOR MODULE OF A WIM SYSTEM FOR TWO-TRACK VEHICLES AND MEASUREMENT METHOD

CROSS-REFERENCE TO RELATED APPLICATIONS

This application claims priority to International Application Serial No. PCT/CH2013/000083, filed May 15, 2013, which claims priority to Swiss Application No. 00697/12 filed May 16, 2012. International Application Serial No. PCT/CH2013/000083 is hereby incorporated herein in its entirety for all purposes by this reference.

FIELD OF THE INVENTION

The present invention relates to a sensor module for measuring the axle speeds and weights of double-track vehicles, comprising a plurality of piezoelectric strip sensors, and a method for dynamically measuring the weight of vehicles while they are travelling on a roadway, wherein a Weigh-In-Motion (WIM) system comprising a plurality of strip sensors is used.

BACKGROUND

The weight of vehicles is measured dynamically while they are moving in traffic on roadways with the aid of a method called Weigh-In-Motion (WIM).

Known WIM systems are based on "strip sensors", which are arranged at intervals of a few meters in the longitudinal direction of the road. The flat, strip-like sensors are designed to function piezoelectrically and are embedded individually at a shallow depth in the road surface and secured in place. The width of the sensor in the direction of travel is usually in the order of a few centimeters, which is why the complete wheel contact surface cannot be evaluated. The piezoelectric effect means that detecting voltage signals is a very simple matter. Captured piezoelectric signals can be converted into force signals, and at the same time the cost of the strip sensors is extremely low. The strip sensors are connected via signal wires to an electronic signal detection unit, which can forward the measurement signals to an evaluation unit.

There are different layouts for the sensor arrangement, a full layout (FULL, FIG. 4a), according to US2011/0127090 for example, which is hereby incorporated herein in its entirety for all purposes by this reference, and a staggered layout (STAGGERED, FIG. 4b) according to WO02/23504.

As a vehicle drives over the sensor arrangement, measurement signals are captured with temporal resolution, from which it is possible to deduce the current vehicle speed. If vehicle wheels pass over two sensors with a given temporal difference, two measurement signals can be captured based on axle load, one from the first sensor and a later signal from the temporally offset sensor. The axle speed may be deduced from the distance between the two sensors, divided by the measured time difference between the signals from the two sensors, as shown in FIG. 4c. In order to calculate the axle loads from the sensor signals, the integrals of the sensor signals must be determined and multiplied with the vehicle speed and a calibration constant. This is necessary for WIM systems in which the sensors are thin strips, so that they are not contacted by the entire wheel surface.

For accurate weight measurements using strip sensors that do not permit direct weight detection, it is therefore imperative for the speeds to be measured extremely accurately.

However, the known sensor arrangements are not favourable for applications in which the speed of the vehicle varies as it travels over the WIM system, because the determination of weight becomes significantly less accurate. This is particularly true for applications in toll and control station areas, and other locations where precisely calibrated weight measurements are needed or desired, and the vehicles drive over the WIM systems slowly, at variable speeds, or even in "stop and go" tempo.

BRIEF SUMMARY OF THE INVENTION

The problem the present invention was designed to solve was that of creating a sensor arrangement of a WIM system with strip sensors that enables improved speed measurement at variable transit speeds, wherein the occurrence of measurement errors is reduced and the rate of successful speed measurements is increased, particularly in "stop and go" traffic.

This problem is solved with a sensor module having the features described herafter. In order to solve the problem, use is made of a sensor module for measuring the axle speeds of double-track vehicles. The sensor includes a plurality of piezoelectric strip sensors, wherein at least four strip sensors in at least two lane groups are arranged transversely (i.e., orthogonally) with respect to the direction of travel and at a distance from each other, so that one axle speed is measurable for each axle of a vehicle passing over the sensor.

As used herein and designated in FIGS. 1a and 1b by the numeral 300, the phrase "wheel contact length" is defined as the length of the surface of the wheel in contact with the roadway measured in the direction of wheel travel. As used herein and shown in FIGS. 1a and 1b, the phrase "offset" is defined as the distance (e.g., LAB, LCD, LAD, LBC) measured in the direction of travel between the respective axial centerlines of a pair of strip sensors that are disposed orthogonally with respect to the direction of travel. As used herein and shown in FIGS. 1a and 1b, the vehicle 3 moving in the direction of travel always encounters the first strip sensor (A or B) in a lane group before encountering the second strip sensor (D or C) in the same lane group.

All strip sensors (A, B, C, D) are arranged orthogonally to the direction of travel, wherein first strip sensors (A, D) relative to each other in the direction of travel (L) of sensor module (1) are arranged at a distance from each other via a fixed longitudinal offset (LAD) which is greater than the maximum wheel contact length and form a first lane group (I). A wheel contact length may be as much as 20 cm, depending on the vehicle type.

Second strip sensors (B, C) relative to each other in the direction of travel (L) of sensor module (1) are arranged at a distance from each other via a secure longitudinal offset (LBC) which is also greater than the maximum wheel contact length, and form a second lane group (II). Strip sensors (A, D) of first lane group (I) transverse to direction of travel (Q) are offset relative to strip sensors (B, C) of second lane group (II), so that each lane group (I, II) covers a lane of the roadway. According to the invention, first strip sensors (A, B) of each lane group (I, II) in the direction of travel (L) have an offset (LAB) from each other of between 1 cm and 15 cm, and second strip sensors (C, D) of each lane group (I, II) in the direction of travel (L) also have an offset (LCD) from each other of between 1 cm and 15 cm. Also, sensor module 1 has a module length (LABCD) of less than 80 cm in the direction of travel.

This type of arrangement firstly guarantees as far as possible that the signals do not occur simultaneously, due to the longitudinal offsets between the individual strip sensors. Secondly, since the total module length is not more than 80 cm, and is therefore shorter than the wheelbase of a typical two-track vehicle, it is guaranteed that the first axle has completely passed over the sensor module before the second axle comes into contact with the sensor module. Since all of the sensors have an offset with respect to each other in the longitudinal direction, it is possible to use the signals that are captured at temporally offset intervals and the known distances between the strip sensors to determine the axle speeds extremely precisely. Since at least four strip sensors also mean that four time signals per axle are captured, there are six possible combinations for determining the speed at which the vehicle passed over the sensors. Even if not all of the measurements according to this arrangement are completed successfully, for example due to stop-and-go driving conditions, only two of the four measurements need to be usable to make it still possible to determine the speed and thus also the loads.

BRIEF DESCRIPTION OF THE DRAWINGS

Embodiments of possible sensor modules, and thus corresponding measuring arrangements and the measuring method are described in the following in conjunction with the accompanying drawings.

FIG. 1a shows a schematic plan view of a first sensor module embedded in a roadway, while

DESCRIPTION OF EXEMPLARY EMBODIMENTS OF THE INVENTION

Figure 1A:
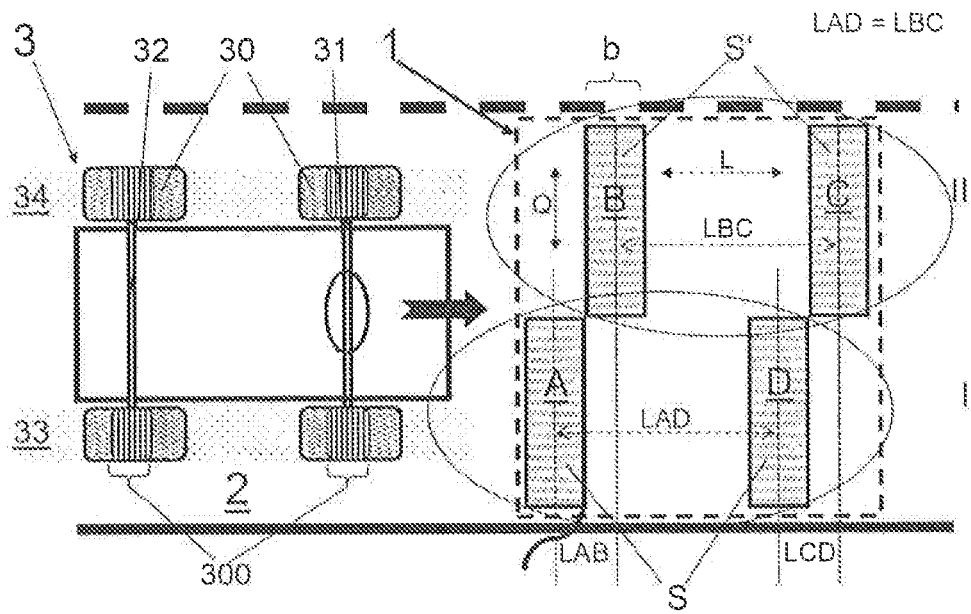

A Weigh-In Motion (WIM) system described here comprises a sensor module 1, which is embedded in a roadway surface 2 of a road, and which may be driven over by a vehicle 3. The direction of travel of vehicle 3 is indicated here with a solid arrow. The vehicle has a first track 33 and a second track 34 at a distance transversely therefrom. In the direction of travel, vehicle 3 passes over sensor module 1 with a first axle 31 and then with a second axle 32. Each axle 31, 32 here comprises two vehicle wheels 30, which have different wheel contact surfaces depending on the type of vehicle 3. Following multiple test series on different vehicles 3, different loads, tire pressure and vehicle wheels 30, it was found that wheel contact length 300 does not exceed 20 cm.

Sensor module 1 extends in a travel direction L and a module transverse direction Q, and comprises a plurality of piezoelectric strip sensors A, B, C, D, which are all arranged orthogonally to the direction of travel. The—for example—four strip sensors A, B, C and D are arranged in such a way that when sensor module 1 is installed the sensors are positioned in a road surface, set a few millimeters deep, and sensor module 1 provides a contact surface for vehicle wheels that is as level as possible. The strip sensors have sensor surfaces S, S'. When reference is made in the following to a shift of sensor surfaces S, S', it refers to a shift of the sensor surface centres in the direction of travel L or module transverse direction Q.

A first strip sensor A and a second strip sensor D of a first lane group I are permanently attached to each other and arranged with a longitudinal offset LAD in travel direction L. Said longitudinal offset LAD is longer than or equal to the largest occurring wheel contact length 300, thus greater than or equal to 20 cm, so that two temporally offset measurement signals are detectable at first strip sensor A and at second strip sensor D when the vehicle passes over.

In direction Q transverse to the travel direction from strip sensors A, D of first lane group I, a first strip sensor B and a second strip sensor C are permanently attached to each other and arranged in a fixed longitudinal offset LBC relative to each other in travel direction L. Here too, longitudinal offset LBC must be at least 20 cm or more in order for strip sensor B, C of second lane group II to be able to deliver two temporally distinct measurement signals. Strip sensors A, B, C, D of each lane group I, II are attached to each other without overlapping in the transverse direction, so that reproducible measurement curves may be recorded from each strip sensor without interference.

The relative positioning of the strip sensors of first lane group I and second lane group II is designed such that distance LAB between the first strip sensors A, B and distance LCD between second strip sensors C, D of the different lane groups is greater than 1 cm and less than 15 cm, preferably greater than 1 cm and less than 8 cm in travel direction L. The distances between strip sensors A, B, C, D in travel direction L are each measured and determined from the middle of the respective strip centres. The strip sensors of the first and second lane groups I, II should be arranged parallel to each other.

The sensor module 1 in FIG. 1a shows a sensor arrangement wherein longitudinal displacement LAD and longitudinal displacement LBC of the two lane groups I, II are identical. If such a sensor arrangement is chosen, it must be ensured that sensor surface S' of the first sensor B in second lane group II does not overlap with sensor surface S of second sensor D, which is offset in direction Q, transversely to the direction of travel. Accordingly, distance LBD must be selected to be greater than 1 cm. When a vehicle 3 passes over sensor module 1 in travel direction L, measuring signals are recorded from the sensors in sequence A, B, D, C. In order to ensure that the first strip sensor B of second lane group II does not overlap in travel direction L with the second strip sensor D of first lane group I, the longitudinal offset between sensors of the first lane group I LAD must be greater than the distance LAB between the first strip sensors A, B.

First sensor A of first lane group I and first sensor B of second lane group II are preferably arranged edge to edge with one another in direction Q transverse to the travel direction. The same applies for the second sensors C and D.

Figure 1B:
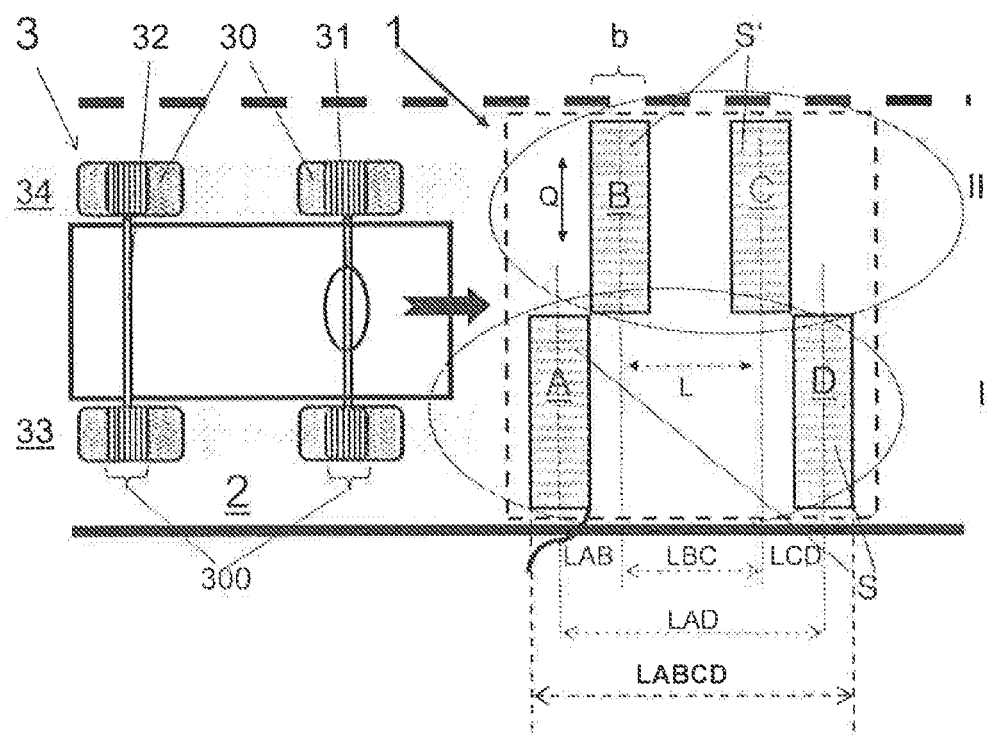
FIG. 1b shows a schematic plan view of a modified sensor module embedded in a roadway.

A further sensor module 1 is shown in FIG. 1b, wherein the longitudinal offset LAD of first lane group I is designed to be greater than the longitudinal offset LBC of second lane group II. The relative distances of the sensors from one another defined in this way must be taken into account correspondingly when evaluating the measurement signals. If a vehicle 3 passes over sensor module 1 in travel direction L, measuring signals are captured by the sensors in the sequence A, B, C, D.

Transit and Measuring Procedure

Six time differences of the captured measurement signals can be determined and evaluated on the basis of defined distances LAB LCD and LBD and longitudinal offsets LAD and LBC. In each case, one level (usually a voltage signal) that varies over time as the vehicle passes over is measured. In order to determine time differences $\Delta t$, the maximum level values in each case and the corresponding associated times are correlated with each other.

Each strip sensor A, B, C, D of each lane group I, II is crossed with a time offset, so that each vehicle wheel 30 passes over at least two sensor strips A, B, C, D, from which it is possible to plot measurement curves. Since the strip sensors are offset in travel direction L, up to six time differences ($\Delta tAB$, $\Delta tAC$, $\Delta tAD$, $\Delta tBC$, $\Delta tBD$, $\Delta tCD$) can be determined from the measured signals after an axle has passed over. On the basis of the time differences and captured measurement levels and the known distances and offsets of the strip sensors, the axle speeds and correspondingly also the axle weights may be determined multiple times. In this way, it is possible to make more accurate statements about the speeds and weights of the vehicles that travel over the sensor strips.

If the vehicle comes to a standstill on one of the strip sensors in "stop and go" traffic, there are still a sufficient number of measurement values to ensure that the speed and therewith also the axle weight can be determined.

In this context, however, it is important for the strip sensors not to be too far apart, because this can impair the accuracy of such speed measurements. They must be at least far enough apart to ensure that the same wheel cannot be passing over two strip sensors A and D or B and C at the same time. However, the longer the distance LAD or LBC, the less accurate the speed measurements become again. Therefore, in the strip sensor array according to the invention, the full length of module LABCD, including all sensors A, B, C and D in their entirety in the direction of travel, is less than 80 cm. With a compact array, it can also be guaranteed that the strip sensors may be manufactured and installed in a compact way in a module.

In this context it is also important that all strip sensors A, B, C and D are each arranged transversely, that is to say orthogonally to the direction of travel, as shown in the figures.

Figure 2:
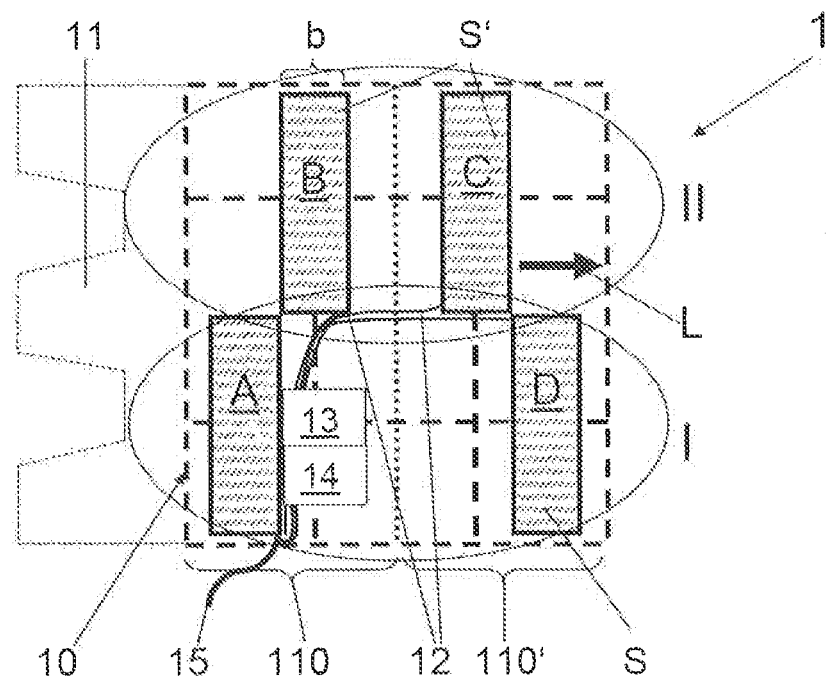
FIG. 2 shows a schematic plan view of the sensor module of FIG. 1b, wherein the sensor arrangement is shown in a frame structure.

FIG. 2 shows a sensor module 1 that has a frame structure 10, which keeps strip sensor A, B, C, D at fixed, defined distances and offsets from each other, as described in the preceding. In this way, strip sensors A, B, C, D of first lane group I and second lane group II are attached to each other but with fixed distances therebetween.

An output wire 15 is routed from sensor module 1, and is usable externally for tapping the measurement values and/or the evaluated data, and for transmitting the bundled measurement values. Measurement signals may be forwarded via signal wires 12 from all of the strip sensors A, B, C, D to an electronic signal acquisition unit 13, which may be disposed within frame structure 10. An evaluation unit 14 to which the captured measurement signals can be routed directly from electronic signal acquisition unit 13 is also arranged in frame structure 10. An arrangement of electronic signal acquisition unit 13 and evaluation unit 14 in frame structure 10 is advantageous because the sensor signals can thus be amplified, detected and processed further directly on site. Optionally, only electronic signal acquisition unit 13 may be located inside frame construction 10, while evaluation unit 14 is located outside. This results in less crosstalk or other interference effects on the measuring signals during the short line segment to electronic signal acquisition unit 13 and/or evaluation unit 14.

The installation is simplified, and mixing up the signal wires 12 is prevented by combining the outbound signals from sensor module 1 signals via an output wire 15.

The frame construction 10 of sensor module 1 shown here comprises a first frame section 110, in which each of the first sensors (A, B) of the first and second lane groups (I, II) are secured, and a second frame section 110', in which each of the second sensors (C, D) of the first and second lane groups (I, II) are fastened. Alternatively, each of the sensors (A, D) of the first lane group (I) may be secured in a first frame section 110, and each of the sensors (B, C) of the second lane group (II) may be fastened in a second frame section 110'.

Frame sections 110, 110' can easily be plugged, welded or bolted together on site. The connections thus made may be either permanent or detachable. The decisive point is that the distances and offsets between and among the strip sensors are defined and unchangeable.

Optionally, a toothed structure 11 may be installed, which improves the fastening of the entire frame structure 10 of sensor module 1 in the road surface.

Figure 3:
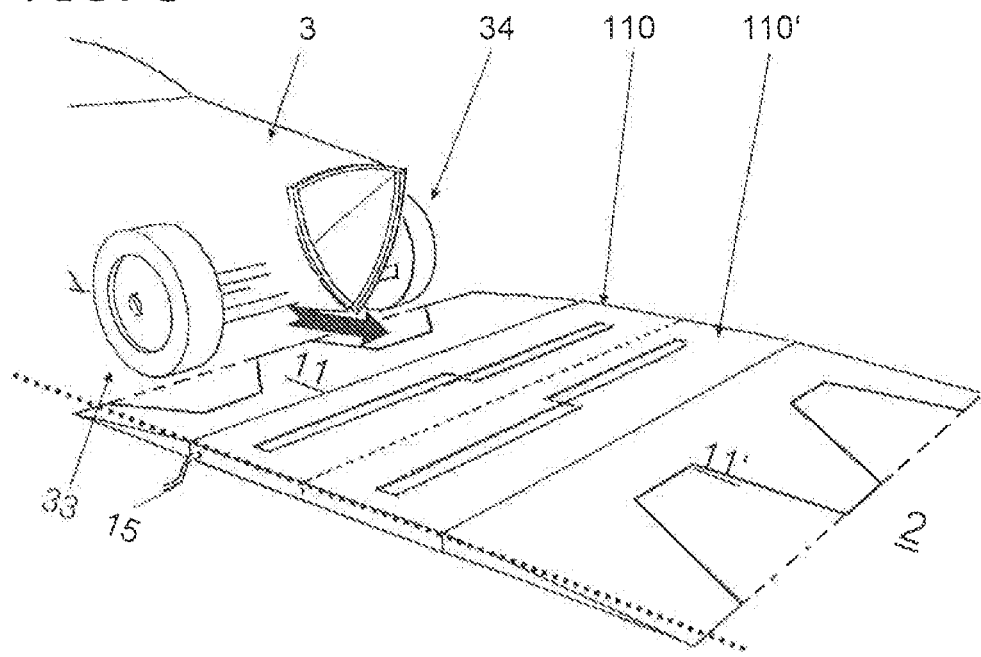
FIG. 3 shows a perspective schematic view of the passage of a vehicle over a sensor arrangement with frame construction according to FIG. 2, wherein optionally two frame structures are provided.
Figure 4A:
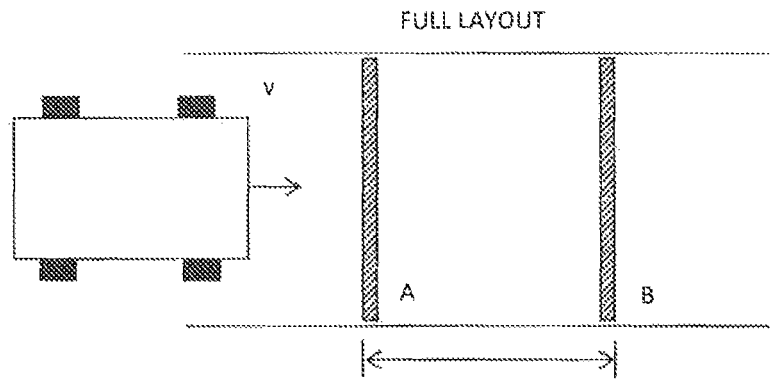
FIG. 4 shows schematic representations of the sensor arrays known from the prior art, comprising strip sensors in WIM systems.
Figure 4B:
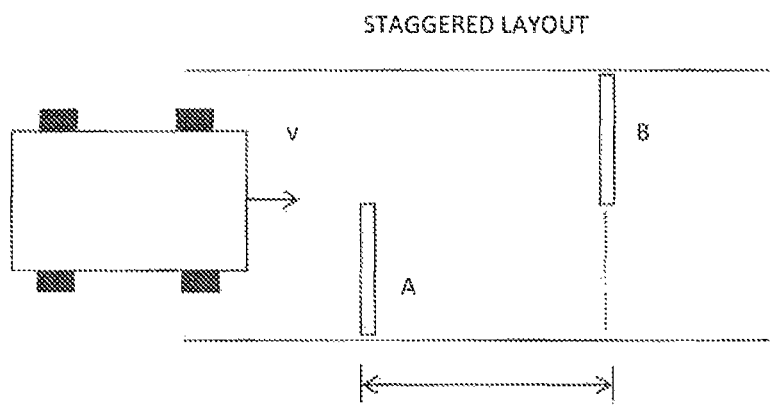
Figure 4C:
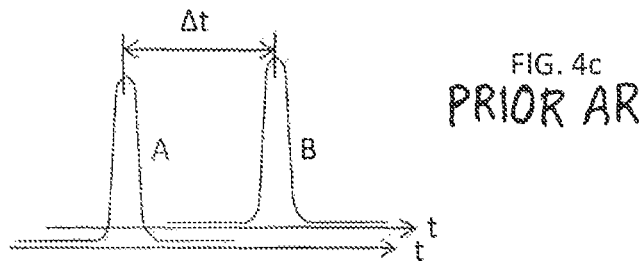

As may be evident from FIG. 3, two toothed structures 11, 11' may be provided with longitudinal separation in travel direction L therebetween, which stabilize the emplacement of sensor module 1 in the road surface. When a vehicle 3 drives over sensor module 1 in the direction of travel, it first passes over the first toothed structure 11, then the multi-part frame structure 10 with strip sensors A, B, C, D, and finally the second toothed structure 11 before returning to the road 2. Toothed structures 11, 11' are designed to penetrate the road surface so that sensor module 1 is anchored in a stable manner in road surface 2, and can be supported sufficiently well in conjunction with the road surface material. In this case, the final implant depth of sensor module 1 is level with the road surface, thus forming a flat surface, so that a vehicle travels over sensor module 1 with practically no disturbance.

Options:

With the described strip sensor arrays, it is possible to create extremely compact sensor modules 1 having a module length LABCD shorter than 80 cm.

In order to be able to dispense with an external power supply to the strip sensors, efforts have recently been made to use the rollover energy to supply the WIM system also. In this sensor module 1, it is possible to use the piezoelectric effect of driving over the second strip sensors C, D of first lane group I and second lane group II to provide the supply voltage necessary for the first strip sensors A, B of both lane groups I, II. Then, pressure loading of the second strip sensors C, D is not detected, but the strip sensors instead serve to supply energy. If speeds have been determined sufficiently from the vehicle's passage over the first strip sensors A, B, a time-staggered additional measurement is not absolutely necessary.

If it has proven impossible to derive an exact axle weight determination after the vehicle has crossed the first strip sensors A, B, then the second strip sensors C, D are activated for taking a measurement.

It is also possible to measure the wheel speeds in each of tracks 33, 34 by detecting the time that elapses between the vehicle passing over the first strip sensors A, B and the second strip sensors C, D for each track. Then, the wheel speed of each vehicle wheel passing over sensor module 1 can be determined.

Sensor surfaces S, S' and the respective sensor surface widths b of the various strip sensors A, B, C, D may optionally be identical or of different sizes. These sizes must be taken into account for the analysis and calculation of weights.

The basic version of the inventive device comprises four strip sensors (A, B, C, D). In a special variant, an expanded sensor module may also contain more sensors to improve the accuracy of the results, for example in additional frame sections 110' according to FIGS. 2 and 3. The distances between said additional sensors and their neighbours in the longitudinal direction and each other in the transverse direction should be consistent with the stated regularities of the other sensor distances. The length of the expanded sensor module is extended correspondingly by up to 40 cm for each sensor pair, which extends transversely across the entire roadway 2.

However, it is advisable to ensure that the entire module length in the direction of travel is not longer than a wheelbase of a vehicle that is to be measured. However, for example four identical frame sections 110 may be arranged one after the other, if rather minimal distances in the longitudinal direction are intended.

LIST OF REFERENCE NUMERALS

1 Sensor module
  10 Frame construction
    110 Frame section
  I First lane group
    A first sensor of the first lane group
    D second sensor of the first lane group
    LAD longitudinal offset between sensors of the first lane group
  II Second lane group
    B first sensor of the second lane group
    C second sensor of the second lane group
    LBC longitudinal offset between sensors of the second lane group
  L Travel direction
  Q Module transverse direction
  LAB Distance between first sensors
  LCD distance between second sensors
  LABCD Module length, measured in the travel direction that fully includes all sensors A, B, C and D
  S, S' sensor surface
    b sensor surface width in travel direction L
  11 Toothed structure
  12 Signal wires
  13 Electronic signal acquisition unit
  14 Evaluation unit
  15 Output wire
2 Road
3 Vehicle
  30 Vehicle wheel
    300 Wheel contact length
  31 first axle
  32 second axle
  33 first track
  34 second track

The invention claimed is:

1. Sensor module for measuring the axle speeds and weights of two-track vehicles, which travel in a direction of travel (L) along a roadway with two lanes, comprising a plurality of piezoelectric strip sensors (A, B, C, D), wherein all the strip sensors (A, B, C, D) have axial centerlines that are arranged orthogonally (Q) to the direction of travel (L), wherein a first strip sensor and a second strip sensor in a first pair of strip sensors (A, D) are spaced from each other in the direction of travel (L) in a first lane group of the sensor module via a first fixed longitudinal offset (LAD) which is greater than the maximum wheel contact length, wherein a first strip sensor (B) and a second strip sensor (C) in a second pair of strip sensors (B, C) are spaced from each other in the direction of travel (L) in a second lane group of the sensor module via a second fixed longitudinal offset (LBC) which is greater than the maximum wheel contact length, wherein the strip sensors (A, D) of the first lane group are arranged with an offset from the strip sensors (B, C) of the second lane group transversely (Q) to the direction of travel (L), so that each lane group covers a separate lane of the roadway, wherein the first strip sensor (A) of the first lane group and the first strip sensor (B) of the second lane group are arranged with an offset between 1 and 15 cm relative to each other in the direction of travel, wherein the second strip sensor (D) of the first lane group and the second strip sensor (C) of the second lane group are arranged with an offset (LAB or LCD) between 1 cm and 15 cm relative to each other in the direction of travel, and the sensor module has a module length (LABCD) less than 80 cm in the direction of travel.

2. Sensor module according to claim 1, wherein the distance (LAB) of the offset between the first strip sensors (A, B) in the direction of travel (L) is greater than 1 cm and less than 8 cm and wherein the distance (LCD) of the offset between the second strip sensors (C, D) of the different lane groups in the direction of travel (L) is greater than 1 cm and less than 8 cm.

3. Sensor module according to claim 1, wherein each of the longitudinal offsets (LAD, LBC) is greater than 20 cm.

4. Sensor module according to claim 1, wherein the strip sensors (A, D) of the first lane group are arranged relative to the strip sensors (B, C) of the second lane group in such manner that all strip sensors (A, B, C, D) are arranged completely separately and with no overlap in the direction of travel (L) and with no overlap in the direction transverse (Q) to the direction of travel (L).

5. Sensor module according to claim 1, wherein the longitudinal offset (LAD) of the first lane group is greater than the longitudinal offset (LBC) of the second lane group.

6. Sensor module according to claim 1, wherein the longitudinal offset (LAD) of the first lane group is equal to the longitudinal offset (LBC) of the second lane group.

7. Sensor module according to claim 1, wherein the sensor module is formed by a frame construction, in which the strip sensors (A, B, C, D) of the first lane group and of the second lane group are mounted with fixed intervals relative to each other.

8. Sensor module according to claim 7, wherein the frame construction comprises at least two frame sections, in which either the strip sensors (A, D) of the first lane group and the second (B, C) lane group are fastened separately, or in which each of the first strip sensors (A, B) and the second strip sensors (C, D) are mounted separately.

9. Sensor module according to claim 7, wherein at least one of an electronic signal acquisition unit and an evaluation unit is secured in the frame structure.

10. Sensor module (1) according to claim 7, wherein an output wire is routed from the frame structure and electrically connected so that it forwards bundled measurement signals from all the strip sensors (A, B, C, D).

11. Sensor module for measuring the axle speeds and weights of two-track vehicles, which travel in a direction of travel (L) along a roadway with two lanes, comprising:
  a plurality of piezoelectric strip sensors (A, B, C, D), wherein all the strip sensors (A, B, C, D) have axial centerlines that are arranged orthogonally (Q) to the direction of travel (L), wherein a first strip sensor and a second strip sensor in a first pair of strip sensors (A, D) are spaced from each other in the direction of travel (L) in a first lane group of the sensor module via a first fixed longitudinal offset (LAD) which is greater than the maximum wheel contact length, wherein a first strip sensor (B) and a second strip sensor (C) in a second pair of strip sensors (B, C) are spaced from each other in the direction of travel (L) in a second lane group of the sensor module via a second fixed longitudinal offset (LBC) which is greater than the maximum wheel contact length, wherein the strip sensors (A, D) of the first lane group are arranged with an offset from the strip sensors (B, C) of the second lane group transversely (Q) to the direction of travel (L), so that each lane group covers a separate lane of the roadway, wherein the first strip sensors (A) of the first lane group and the first strip sensor (B) of the second lane group are arranged with an offset between 1 and 15 cm relative to each other in the direction of travel, wherein the second strip sensors (D) of the first lane group and the second strip sensor (C) of the second lane group are arranged with an offset (LAB or LCD) between 1 cm and 15 cm relative to each other in the direction of travel, and the sensor module has a module length (LABCD) less than 80 cm in the direction of travel; wherein the sensor module is formed by a frame construction, in which the strip sensors (A, B, C, D) of the first lane group and of the second lane group are mounted with fixed intervals relative to each other; and wherein a toothed structure is fastened to at least one surface before or after the frame structure in the direction of travel (L).

12. Sensor module according to claim 11, wherein the toothed structure is positioned at the level of a road surface.

13. Sensor module according to claim 1, wherein the first strip sensor (A) of the first lane group and the first strip sensor (B) of the second lane group are arranged edge to edge in a direction (Q) transverse to the direction of travel (L).

14. Sensor module according to claim 1, wherein the plurality of strip sensors includes more than four strip sensors (A, B, C, D) and the strip sensors in excess of four strip sensors are arranged additionally to improve the accuracy of the results.

15. Method for dynamically measuring the weight of vehicles travelling on a roadway, wherein a sensor module comprising a plurality of strip sensors (A, B, C, D) is used, wherein all the strip sensors (A, B, C, D) have axial centerlines that are arranged orthogonally (Q) to the direction of travel (L), wherein a first strip sensor (A) and a second strip sensor (D) in a first pair of strip sensors are spaced from each other in the direction of travel (L) in a first lane group of the sensor module via a first fixed longitudinal offset (LAD) which is greater than the maximum wheel contact length, wherein a first strip sensor (B) and a second strip sensor (C) in a second pair of strip sensors are spaced from each other in the direction of travel (L) in a second lane group of the sensor module via a second fixed longitudinal offset (LBC) which is greater than the maximum wheel contact length, wherein the strip sensors (A, D) of the first lane group are arranged with an offset from the strip sensors (B, C) of the second lane group transversely (Q) to the direction of travel (L), so that each lane group covers a separate lane of the roadway, wherein the first strip sensor (A) of the first lane group and the first strip sensor (B) of the second lane group are arranged with an offset between 1 and 15 cm relative to each other in the direction of travel (L), wherein the second strip sensor (D) of the first lane group and the second strip sensor (C) of the second lane group are arranged with an offset between 1 cm and 15 cm relative to each other in the direction of travel (L), and the sensor module has a module length (LABCD) less than 80 cm in the direction of travel, wherein:
   a) the sensor module uses time-staggered capture of measurement signals of the strip sensors (A, B, C, D), in order to achieve uncoupled measurement signals, and subsequent
   b) calculation of the axle weights of the vehicle by using at least one integral for each lane group of the time-resolved measurement signal curves and at least one of the determined speeds of the vehicle between the strip sensor pairs (AB, AC, AD, BC, BD, CD) while travelling.

16. Method according to claim 15, wherein the measurement signals are captured alternatingly by a strip sensor (A, D) of the first lane group and by a strip sensor (B, C) of the second lane group.

17. Method according to claim 15, wherein the measurement signals are detected from the first strip sensor (A) of the first lane group, from the first strip sensor (B) of the second lane group, from the second strip sensor (C) of the second lane group and finally from the second strip sensor (D) of the first lane group.

18. Method according to claim 15, wherein the measurement signals of the second strip sensors (C, D) are only captured if correct axle weights could not be determined from the measurement signals of the first strip sensors (A, B).

19. Sensor module according to claim 1, further comprising:
   an electronic signal acquisition unit connected to the strip sensors and configured to receive a and electric signal upon activation of a respective strip sensor; and
   an evaluation unit electronically connected to the electronic signal acquisition unit and configured to determine the time differences between each pair of signals received from the electronic signal acquisition unit, wherein a first one of these time differences occurs between the signal from the first strip sensor of the first lane group and the signal from the first strip sensor of the second lane group, a second one of these time differences occurs between the signal from the first strip sensor of the first lane group and the signal from the second strip sensor of the second lane group, a third one of these time differences occurs between the signal from the first strip sensor of the first lane group and the signal from the second strip sensor of the first lane group, a fourth one of these time differences occurs between the signal from the first strip sensor of the second lane group and the signal of the second strip sensor of the second lane group, a fifth one of these time differences occurs between the signal from the first strip sensor of the second lane group and the second strip sensor of the first lane group, and a sixth one of these time differences occurs between the signal from the second strip sensor of the first lane group and the signal from the second strip sensor of the second lane group.

* * * * *

UNITED STATES PATENT AND TRADEMARK OFFICE
CERTIFICATE OF CORRECTION

PATENT NO. : 9,488,517 B2
APPLICATION NO. : 14/400928
DATED : November 8, 2016
INVENTOR(S) : Cornu et al.

Page 1 of 1

It is certified that error appears in the above-identified patent and that said Letters Patent is hereby corrected as shown below:

On the Title Page

Please delete: "(86) PCT No.: PCT/CH2013/000086"
Please insert: --(86) PCT No.: PCT/CH2013/000083--

Signed and Sealed this
Tenth Day of April, 2018

Andrei Iancu
*Director of the United States Patent and Trademark Office*